(12) United States Patent
Nakayama

(10) Patent No.: US 8,779,019 B2
(45) Date of Patent: Jul. 15, 2014

(54) EXPANDED PARTICLE OF NONCROSSLINKED POLYETHYLENE-BASED RESIN AND EXPANSION MOLDED ARTICLE OF NONCROSSLINKED POLYETHYLENE-BASED RESIN

(75) Inventor: Kiyotaka Nakayama, Settsu (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 13/521,655

(22) PCT Filed: Jan. 14, 2011

(86) PCT No.: PCT/JP2011/000164
§ 371 (c)(1),
(2), (4) Date: Jul. 11, 2012

(87) PCT Pub. No.: WO2011/086938
PCT Pub. Date: Jul. 21, 2011

(65) Prior Publication Data
US 2012/0283347 A1    Nov. 8, 2012

(30) Foreign Application Priority Data

Jan. 15, 2010 (JP) .................. 2010-007234

(51) Int. Cl.
*C08J 9/16* (2006.01)
*C08J 9/00* (2006.01)
*C08J 9/18* (2006.01)
*C08J 9/232* (2006.01)

(52) U.S. Cl.
CPC ............ *C08J 9/0023* (2013.01); *C08J 2323/06* (2013.01); *C08J 2323/08* (2013.01); *C08J 9/18* (2013.01); *C08J 9/232* (2013.01); *C08J 2201/034* (2013.01); *C08J 9/16* (2013.01)
USPC .......................................... 521/144; 264/41

(58) Field of Classification Search
CPC ...... C08J 9/16; C08J 2323/06; C08J 2323/08; C08J 2205/042; C08J 9/18; C08J 9/232; C08J 2201/034; C08J 9/0023
USPC ........................................................ 521/144
See application file for complete search history.

(56) References Cited

U.S. PATENT DOCUMENTS

| | | | | |
|---|---|---|---|---|
| 4,399,087 A | * | 8/1983 | Akiyama et al. | 264/53 |
| 4,483,809 A | | 11/1984 | Ando et al. | |
| 4,617,322 A | * | 10/1986 | Senda et al. | 521/60 |
| 5,026,736 A | * | 6/1991 | Pontiff | 521/60 |
| 5,622,756 A | * | 4/1997 | Tokoro et al. | 428/36.5 |
| 5,679,450 A | * | 10/1997 | Tokoro et al. | 428/304.4 |
| 6,028,121 A | * | 2/2000 | Takeda et al. | 521/56 |
| 6,133,331 A | * | 10/2000 | Oikawa et al. | 521/60 |
| 6,822,023 B2 | * | 11/2004 | Stuart et al. | 524/80 |
| 2010/0267850 A1 | * | 10/2010 | Yoshida et al. | 521/56 |

FOREIGN PATENT DOCUMENTS

| | | |
|---|---|---|
| JP | 63-47128 A | 2/1966 |
| JP | 49-9574 | 1/1974 |
| JP | 49-85158 | 8/1974 |
| JP | 51-91971 | 8/1976 |
| JP | 58-136632 A | 8/1983 |
| JP | 5-163381 A | 6/1993 |
| JP | 8-81576 A | 3/1996 |
| JP | 2000-17079 A | 1/2000 |
| JP | 2009-40983 A | 2/2009 |
| WO | WO 2009/075208 A1 | 8/2009 |

OTHER PUBLICATIONS

English translation of International Preliminary Report on Patentability and Written Opinion issued Aug. 16, 2012, in PCT International Application No. PCT/JP2011/000164.
International Search Report issued Feb. 8, 2011, in PCT International Application No. PCT/JP2011/000164, with English translation.

* cited by examiner

*Primary Examiner* — Randy Gulakowski
*Assistant Examiner* — Christina Wales
(74) *Attorney, Agent, or Firm* — Birch, Stewart, Kolasch & Birch, LLP

(57) ABSTRACT

A noncrosslinked polyethylene resin expanded particle is provided having a bulk density BD in a range of 10 g/L to 100 g/L, the particle being obtained by expanding a polyethylene resin particle whose density is in a range of 0.920 g/cm³ to 0.940 g/cm³, the noncrosslinked polyethylene resin expanded particle having a shrinkage factor in a range of 2% to 30%, the shrinkage factor being obtained by the following formula (1):

Shrinkage Factor $=(BD-VBD)\times 100/VBD$    (1), wherein: the BD of the noncrosslinked polyethylene expanded particle is a bulk density at 23° C. and at 0.1 MPa (at a normal atmospheric pressure); and the VBD of the noncrosslinked polyethylene expanded particle is a bulk density at 23° C. and at a reduced pressure of 0.002 MPa or less.

11 Claims, 1 Drawing Sheet

(a)
LONGITUDINAL DIRECTION
LATERAL DIRECTION
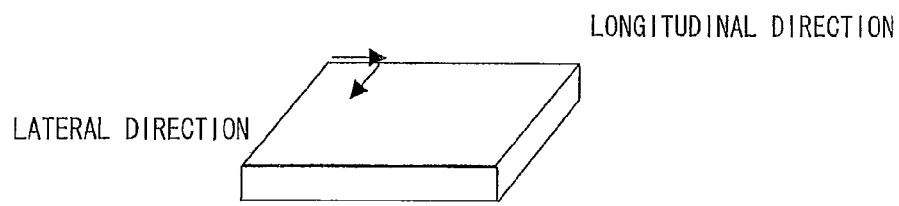
(b)
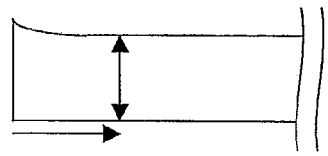
LENGTH OF EACH ONE-SIDED ARROW INDICATES 50 mm.
THICKNESS INDICATED BY DOUBLE-SIDED ARROW IS MEASURED BY NECK CALIPER.

EXPANDED PARTICLE OF NONCROSSLINKED POLYETHYLENE-BASED RESIN AND EXPANSION MOLDED ARTICLE OF NONCROSSLINKED POLYETHYLENE-BASED RESIN

TECHNICAL FIELD

The present invention relates to a noncrosslinked low-density polyethylene resin expanded particles and a noncrosslinked polyethylene resin expansion molded article made from the noncrosslinked low-density polyethylene resin expanded particles.

BACKGROUND ART

The polyethylene resin expansion molded articles are widely used for buffer packing materials or the like. These polyethylene resin expansion molded articles are produced from polyethylene resin expanded particles.

In a case where a polyethylene resin expansion molded article is produced from polyethylene resin expanded particles, thus obtained expansion molded article has a large dimensional shrinkage factor with respect to a metal mold and a poor dimensional accuracy. This problem tends to emerge noticeably particularly in a case where the polyethylene resin expanded particles are obtained by using inorganic gas as a foaming agent.

In order to solve the above problem, various studies have been made. For example, studies have been carried out on a method in which foaming capability is given by adding various molding gases to expanded particles (Patent Literatures 1 and 2), a method in which foaming capability is provided by compression of expanded particles (Patent Literature 3), a method in which a ratio of an expansion ratio of pre-expanded particles and an expansion ratio of expanded particles used in molding are controlled within a predetermined range (Patent Literature 4), and a method in which a complex temperature history is given after molding (Patent Literatures 5 and 6).

However, each of the above methods has advantages and disadvantages. Further, there are restriction due to equipment and many other problems that need to be solved. For example, in the case where molding gas is added as described in Patent Literatures 1 or 2, equipment for adding gas to expanded particles is required. Further, for preventing deterioration in given foaming capability, such equipment for adding gas and a molding process need to be integrated or arranged to be continuous.

For the method in which expanded particles are compressed as described in Patent Literature 3, equipment for the compression is required. Further, such equipment for the compression needs to be integrated with a molding machine. In addition, in this method, there are problems such that performance in filling the expanded particles is poor and a ratio at which defective products occur is high as compared to a case where the expanded particles are not compressed.

In regard to the method as described in Patent Literature 4 in which a ratio of an expansion ratio of pre-expanded particles and an expansion ratio of expanded particles used in molding is controlled, it is necessary to prepare pre-expanded particles having an expansion ratio that is unnecessarily high. Further, for controlling the ratio of the expansion ratios described above, it is necessary to retain the pre-expanded particles in an atmosphere at a temperature of approximately 60° C. for hours so that the expansion ratio of the pre-expanded particles is adjusted to a desired level.

In regard to the method as described in Patent Literatures 5 and 6 in which a complex temperature history is given after molding, work operations are complicated. Therefore, this method is not advantageous as a production process.

As described above, it has been difficult to easily obtain a noncrosslinked polyethylene resin expanded particles that allows providing, by a simple method, a polyethylene resin expansion molded article whose dimensional shrinkage factor with respect to a metal mold is small, whose deformation is small, and whose surface stretches well.

CITATION LIST

Patent Literatures

Patent Literature 1
Japanese Patent Application Publication, Tokukaishou, No. 49-85158
Patent Literature 2
Japanese Patent Application Publication, Tokukai, No. 2000-17079 A
Patent Literature 3
Japanese Patent Application Publication, Tokukaishou, No. 49-9574
Patent Literature 4
Japanese Patent Application Publication, Tokukaishou, No. 58-136632
Patent Literature 5
Japanese Patent Application Publication, Tokukaishou, No. 51-91971
Patent Literature 6
Japanese Patent Application Publication, Tokukaishou, No. 63-47128

SUMMARY OF INVENTION

Technical Problem

The present invention makes it possible to simply provide a noncrosslinked polyethylene resin expanded particles that make it possible to produce a noncrosslinked polyethylene resin expansion molded article whose dimensional shrinkage factor with respect to a metal mold is small, whose deformation is small, and whose surface stretches well.

Solution to Problem

In order to solve the above problems, the inventors of the present invention carried out diligent studies. As a result, the inventors found that by using noncrosslinked polyethylene resin expanded particles having a moderate contractility, it was possible to obtain by in-mold expansion molding a noncrosslinked polyethylene resin expansion molded article that has a small dimensional shrinkage factor with respect to a metal mold, that deforms less, and that has a surface stretching well. Such a noncrosslinked polyethylene resin expansion molded article could be obtained without giving foaming capability, for example, by adding no additional molding gas. Consequently, the inventors of the present invention accomplished the present invention.

In other words, the present invention is configured as follows:

[1] A noncrosslinked polyethylene resin expanded particle having a bulk density BD in a range of not less than 10 g/L and not more than 100 g/L, the noncrosslinked polyethylene resin expanded particle being obtained by expanding a polyethylene resin particle whose density is in a range of not less than 0.920 g/cm$^3$ and less than 0.940 g/cm$^3$, the noncrosslinked polyethylene resin expanded particle having a shrinkage factor in a range of not less than 2% and not more than 30%, the shrinkage factor being obtained by the following formula (1):

Shrinkage Factor=(BD−VBD)×100/VBD  (1), wherein: the BD is a bulk density of the noncrosslinked polyethylene expanded particle at 23° C. and at 0.1 MPa (at a normal atmospheric pressure); and the VBD is a bulk density of the noncrosslinked polyethylene expanded particle at 23° C. and at a reduced pressure of 0.002 MPa or less.

[2] The noncrosslinked polyethylene resin expanded particle as set forth in [1], including not less than 0.01 part by weight and not more than 10 parts by weight of a hydrophilic compound with respect to 100 parts by weight of polyethylene resin.

[3] The noncrosslinked polyethylene resin expanded particle as set forth in [1] or [2], wherein the hydrophilic compound is at least one kind selected from among a group consisting of glycerin, polyethyleneglycol, and polypropyleneglycol.

[4] The noncrosslinked polyethylene resin expanded particle as set forth in [3], wherein: an amount of the at least one kind selected from among the group consisting of glycerin, polyethyleneglycol, and polypropyleneglycol is in a range of not less than 0.05 part by weight and not more than 2 parts by weight with respect to 100 parts by weight of polyethylene resin.

[5] The noncrosslinked polyethylene resin expanded particle as set forth in any one of [1] to [4], being obtained by using inorganic gas as a foaming agent, the noncrosslinked polyethylene resin expanded particle having an average cell diameter in a range of not less than 200 μm and not more than 700 μm.

[6] A noncrosslinked polyethylene resin expansion molded article obtained by in-mold expansion molding of the noncrosslinked polyethylene resin expanded particle as set forth in any one of [1] to [5] having been filled in a metal mold.

Advantageous Effects of Invention

According to the noncrosslinked polyethylene resin expanded particles of the present invention, it is possible to simply obtain, by adding no additional molding gas for giving foaming capability, a noncrosslinked polyethylene resin expansion molded article whose dimensional shrinkage factor with respect to a metal mold is small, whose deformation is small, and whose surface stretches well.

BRIEF DESCRIPTION OF DRAWINGS

FIG. 1 is a schematic diagram illustrating a position where deformation is measured in evaluating deformation of an in-mold expansion molded article obtained in Examples and Comparative Examples. (a) of FIG. 1 shows a position for measurement of the in-mold expansion molded article, for evaluating deformation of the in-mold expansion molded article obtained. (b) of FIG. 1 shows a position of measurement viewed from a lateral side of the in-mold expansion molded article.

DESCRIPTION OF EMBODIMENTS

According to the present invention, a noncrosslinked polyethylene resin expanded particle has a bulk density in a range of not less than 10 g/L and not more than 100 g/L, the noncrosslinked polyethylene resin expanded particle being obtained by expanding a polyethylene resin particle whose density is in a range of not less than 0.920 g/cm$^3$ and less than 0.940 g/cm$^3$, the noncrosslinked polyethylene resin expanded particle having a shrinkage factor in a range of not less than 2% and not more than 30%, the shrinkage factor being obtained by the following formula (1):

Shrinkage Factor=(BD−VBD)×100/VBD  (1), wherein: the BD is a bulk density of the noncrosslinked polyethylene expanded particle at 23° C. and at 0.1 MPa; and the VBD is a bulk density of the noncrosslinked polyethylene expanded particle at 23° C. and at a reduced pressure of 0.002 MPa or less.

Examples of polyethylene resin used in the present invention are a high-density polyethylene resin, a medium-density polyethylene resin, a low-density polyethylene resin, and a linear low-density polyethylene resin. Among the above resins, in particular, the linear low-density polyethylene resin (hereinafter, also abbreviated as "LLDPE") is preferably used. This is because by using the linear low-density polyethylene resin, it is possible to obtain an in-mold expansion molded article of highly-expanded polyethylene resin.

Examples of a composition of the polyethylene resin used in the present invention are an ethylene homopolymer and a copolymer of ethylene and α-olefin having a carbon number of 4 to 10.

Examples of the α-olefin whose carbon number is 4 to 10 are 1-butene, 1-pentene, 1-hexene, 3,3-dimethyl-1-butene, 4-methyl-1-pentene, 4,4-dimethyl-1-pentene, 1-octene, and the like.

A content of the α-olefin in an entire polyethylene resin is preferably in a range of 1% by weight to 20% by weight, and more preferably in a range of 3% by weight to 10% by weight. In a case where the content of the α-olefin is over 20% by weight, strength against bending, compression, or the like tends to deteriorate.

The density of the polyethylene resin used in the present invention is preferably in a range of not less than 0.920 g/cm$^3$ and less than 0.940 g/cm$^3$, and more preferably, in a range of not less than 0.925 g/cm$^3$ and less than 0.940 g/cm$^3$. In a case where the density of the polyethylene resin particle is less than 0.920 g/cm$^3$, shrinkage of the noncrosslinked polyethylene resin expanded particle or noncrosslinked polyethylene resin expansion molded article obtained tends to become higher. Meanwhile, in a case where the density of the polyethylene resin particle is 0.940 g/cm$^3$ or higher, a temperature range in which the polyethylene resin particle is expandable tends to be narrow.

In the present invention, as long as the density of the polyethylene resin can be in a range of not less than 0.920 g/cm$^3$ and less than 0.940 g/cm$^3$, polyethylene resins of different densities or the like may be mixed. Accordingly, it is possible to use a polyethylene resin obtained by mixing a low-density polyethylene (LDPE), a high-density polyethylene (HDPE), or the like into an LLDPE.

The noncrosslinked polyethylene resin particle in the present invention has a fraction of insoluble gel in hot xylene in a range of 3.0% or less.

Here, the fraction of insoluble gel is expressed in a numerical value of a weight ratio of an amount of gel component with respect to an original amount of resin. The amount of gel component is measured according to the following method. That is, 0.5 g of resin particles or expanded particles are put in a wire mesh bag having 200 meshes, and an end of the wire mesh is folded so that the particles do not come out. Then, the wire mesh bag is immersed for 3 hours in 50 ml of xylene boiled at an atmospheric pressure. After cooled down, the wire mesh bag is taken out from the xylene. This operation is repeated three times in total. Further, the wire mesh bag taken out of the xylene is dried overnight at a room temperature. Furthermore, the wire mesh bag is dried in an oven at 150° C. for an hour and then naturally cooled down to the room temperature. An amount of a component that remains in the wire mesh bag cooled down here is defined as the amount of gel component.

The noncrosslinked polyethylene resin expanded particle of the present invention has a moderate contractility. Accordingly, as compared to a case where the noncrosslinked polyethylene resin expanded particle is not contractile, the noncrosslinked polyethylene resin expanded particle of the present invention has a higher foaming capability in molding. This makes it possible to obtain, by adding no additional molding gas, a molded article whose dimensional shrinkage factor with respect to a metal mold is small and whose surface stretches well.

For expressing the moderate contractility, the inventors of the present invention carried out studies on various physical properties. As a result, the inventors of the present invention found that the contractility could be expressed appropriately by using a shrinkage factor obtained by the following formula (1). According to the formula, the shrinkage factor can be obtained from (a) a bulk density BD of the noncrosslinked polyethylene resin expanded particle at 23° C. and at 0.1 MPa (at a normal atmospheric pressure) and (b) a bulk density VBD of the noncrosslinked polyethylene resin expanded particle at 23° C. and at a reduced pressure of 0.002 MPa or less.

Note that the reduced pressure of 0.002 MPa or less is a pressure level that is considered to be substantially vacuum in general vacuum devices (i.e. vacuum thermostat).

The noncrosslinked polyethylene resin expanded particle of the present invention has the shrinkage factor preferably in a range of not less than 2% and not more than 30%, and more preferably in a range of not less than 3% and not more than 20%. The shrinkage factor is obtained in the following formula (1):

$$\text{Shrinkage Factor} = (BD - VBD) \times 100 / VBD \quad (1),$$

wherein: the BD is a bulk density of the noncrosslinked polyethylene resin expanded particle at 23° C. and at 0.1 MPa (at a normal atmospheric pressure); and the VBD is a bulk density of the noncrosslinked polyethylene resin expanded particle at 23° C. and at a reduced pressure of 0.002 MPa or less.

In a case where the shrinkage factor of noncrosslinked polyethylene resin expanded particle is less than 2%, foaming power tends to be insufficient in in-mold expansion molding. As a result, a noncrosslinked polyethylene resin expansion molded article obtained tends to be poorly fused and tends to have a surface stretching poorly. In a case where the shrinkage factor is over 30%, the noncrosslinked polyethylene resin expansion molded article tends to be fused only at a surface but not inside the resultant noncrosslinked polyethylene resin expansion molded article.

The followings are examples of a method for obtaining the noncrosslinked polyethylene resin expanded particle whose shrinkage factor is in a range of not less than 2% and not more than 30%:

(1) a method in which: (i) first, polyethylene resin particles, water, a foaming agent, and a dispersing agent are introduced all together into a pressure-resistant container; and (ii) after a temperature and a pressure inside the pressure-resistant container are kept at predetermined levels, respectively, the polyethylene resin particles are discharged from the pressure-resistant container into a low-pressure atmosphere whose temperature is controlled so as to be in a range of not less than 60° C. and not more than 120° C.;

(2) a method in which: (i) first, polyethylene resin particles, water, a foaming agent, and a dispersing agent are introduced all together into a pressure-resistant container; (ii) after a temperature and a pressure inside the pressure-resistant container are kept at predetermined levels, respectively, the polyethylene resin particles are discharged from the pressure-resistant container into a low-pressure atmosphere; and (iii) noncrosslinked polyethylene resin expanded particles obtained as a result of the discharge are further expanded by giving an internal pressure with the air or the like and by heating with water vapor, for obtaining a noncrosslinked polyethylene resin expanded particles having a higher expansion ratio (so-called second stage expansion step), and in this expansion, a vapor pressure is set in a range of not less than 0.03 MPa (gauge pressure) and not more than 0.15 MPa (gauge pressure) and preferably in a range of not less than 0.045 MPa (gauge pressure) and not more than 0.10 MPa;

(3) a method in which the noncrosslinked polyethylene resin expanded particles obtained is heated with water vapor while no internal pressure is given to the noncrosslinked polyethylene resin expanded particles; and (4) a method employing polyethylene resin particles that contain a predetermined amount of a hydrophilic compound described later.

The noncrosslinked polyethylene resin particle of the present invention preferably contains, with respect to 100 parts by weight of polyethylene resin, not less than 0.01 part by weight and not more than 10 parts by weight and preferably not less than 0.05 part by weight and not more than 2 parts by weight of a hydrophilic compound. In a case where a content of the hydrophilic compound is less than 0.01 part by weight, a water content is small in expanded particles obtained. Accordingly, the shrinkage factor of the expanded particles tends to be too small. In addition, it becomes difficult to uniformly disperse the hydrophilic compound throughout the resin particles. This causes unevenness in quality among the expanded particles. In a case where the content of the hydrophilic compound is over 10 parts by weight, the water content is large in the expanded particles obtained. Accordingly, the expanded particles tend to shrink too much after the expanded particles are dehydrated. In addition, cells of the expanded particles obtained tend to be uneven.

The hydrophilic compound is a compound containing a hydrophilic group in a molecule or a derivative thereof. Examples of the hydrophilic group are a carboxyl group, a hydroxyl group, an amino group, an amide group, an ester group, a sulfo group, a polyoxyethylene group, and the like. The hydrophilic compound also encompasses hydrophilic polymers. Specific examples of the compound containing such a hydrophilic group and the derivative thereof are: lauric acid, sodium laurate, and the like as the compound containing a carboxylic acid; ethylene glycol, glycerine and the like as the compound containing a hydroxyl group; and glycerin ester of fatty acid having a carbon number in a range of not less than 10 and not more than 25, as the compound containing an ester group. As other hydrophilic organic compounds, there is an organic compound having a triazine ring, for example, melamine (chemical name: 1,3,5-triazine-2,4,6-triamine), isocyanuric acid, and isocyanuric acid condensate.

Note that the hydrophilic polymer is a polymer whose water absorption rate measured in conformity to ASTM D570 is 0.5% by weight or higher. This hydrophilic polymer encompasses a water-absorbing polymer that is insoluble in water and that absorbs water whose weight is several times to some hundred times as large as a weight of the hydrophilic polymer itself. Further, the water-absorbing polymer is hardly dehydrated even when pressure is applied. The hydrophilic polymer also encompasses a polymer soluble in water. This polymer is dissolved in water at a room temperature or a higher temperature.

Specific examples of the hydrophilic polymer are:
(a) ionomer resin in which (i) carboxylic acid of ethylene-acrylic acid-maleic anhydride terpolymer or carboxylic acid of ethylene-(meta)acrylic acid copolymer, for example, is neutralized by alkali metal ions such as sodium ions or potassium ions or transition metal ions such as zinc ions and (ii) molecules are crosslinked;
(b) a polymer containing a carboxyl group, for example, ethylene-(meta)acrylic acid copolymer;
(c) polyamide such as nylon-6, nylon-6,6, and copolymer nylon;
(d) a nonionic water-absorbing polymer such as polyethylene glycol and polypropylene glycol;
(e) a polyether-polyolefin resin block copolymer a typical example of which is PELESTAT (product name, manufactured by Sanyo-Chemical Industries Ltd.); and
(f) a crosslinked polyethylene oxide copolymer a typical example of which is AQUA CALK (product name, manufactured by SUMITOMO SEIKA CHEMICALS Co., Ltd.). These hydrophilic polymers may be used solely or in combination of two or more kinds.

Among the hydrophilic polymers, the nonionic water-absorbing polymer and the polyether-polyolefin resin block copolymer are preferable. This is because the nonionic water-absorbing polymer and the polyether-polyolefin resin block copolymer have a relatively excellent stability in dispersion within the pressure-resistant container, and a relatively small amount of the nonionic water-absorbing polymer or the polyether-polyolefin resin block copolymer provides water absorbency.

Among the above hydrophilic substances, glycerin, polyethylene glycol, and polypropylene glycol are preferable for the following reasons. That is, when the expanded particles contains even a small content of glycerin, polyethylene glycol, or polypropylene glycol, an expansion ratio of expanded particles obtained tends to become high and the cells of the expanded particles obtained does not become finer. As a result, foaming power of the expanded particles obtained becomes high in molding. Consequently, it becomes easier to obtain a molded article whose shrinkage factor is small and whose surface stretches well.

In the present invention, a content of at least one kind selected from a group consisting of glycerin, polyethylene glycol, and polypropylene glycol is preferably in a range of not less than 0.05 part by weight and not more than 2 parts by weight and more preferably in a range of not less than 0.05 part by weight and not more than 0.5 part by weight with respect to 100 parts by weight of polyethylene resin. In a case where the content of the at least one kind selected from the group consisting of glycerin, polyethylene glycol, and polypropylene glycol is less than 0.05 part by weight, the expansion ratio tends to be lower. Meanwhile, even if the content is increased to higher than 2 parts by weight, further improvement in the expansion ratio tends to be difficult.

To the polyethylene resin particles of the present invention, it is possible to add, as needed, a cell nucleating agent, an oxidation inhibitor, a compatibilizer, an antistatic agent, a coloring agent, and a fire retardant.

The polyethylene resin particles used in the present invention can be produced as follows, for example. Specifically, polyethylene resin is mixed by a mixing method such as a dry blend method and a master batch method, with the hydrophilic compound and/or other additives. Then, thus obtained mixture is melted and kneaded by using an extruder, a kneader, Banbury mixer (registered trademark), a roll, and the like. Thereby, the mixture is processed so as to give polyethylene resin particles each of which has a particle weight in a range of 0.2 mg/particle to 10 mg/particle and more preferably in a range of 0.5 mg/particle to 6 mg/particle. Further, the hydrophilic compound in the form of liquid may be added directly in the extruder and melting and kneading may be carried out.

The noncrosslinked polyethylene resin expanded particle of the present invention may be produced as follows, for example.

First, polyethylene resin particles, water, a foaming agent, and a dispersing agent are introduced all together into a pressure-resistant container. Then, after a temperature and a pressure inside the pressure-resistant container are retained at predetermined levels, respectively, the polyethylene resin particles are discharged from the pressure-resistant container into a low-pressure atmosphere. Thereby, the noncrosslinked polyethylene resin expanded particle of the present invention can be obtained. Note that, hereinafter, this foaming step may be referred to as "first stage expansion step".

The pressure-resistant container used in the foaming step is not specifically limited. Any pressure-resistant container may be used as long as the pressure-resistant container is resistant to pressure and temperature within the pressure-resistant container in production of the noncrosslinked polyethylene resin expanded particle. An example of such a pressure-resistant container is an autoclave container.

An amount of water used in the foaming step is preferably in a range of not less than 100 parts by weight and not more than 500 parts by weight with respect to 100 parts by weight of the polyethylene resin particles, for obtaining preferable dispersibility of the polyethylene resin particles in water.

The dispersing agent used in the foaming step is preferably a poorly water-soluble inorganic compound. The poorly water-soluble inorganic compound here indicates an inorganic compound that dissolves in water at 25° C. in an amount of less than 1% by weight. Examples of the poorly water-soluble inorganic compound are: alkali earth metal salts such as calcium carbonate, barium carbonate, tricalcium phosphate, dicalcium phosphate, trimagnesium phosphate, tribarium phosphate, barium sulfate, and calcium pyrophosphate; and alumino silicate such as kaolin and clay.

An amount of the dispersing agent used in the foaming step depends on a kind of the dispersing agent, or a kind or an amount of the polyethylene resin particles employed. Accordingly, the amount cannot be unconditionally defined. However, the amount is preferably in a range of not less than 0.2 part by weight and not more than 5 parts by weight and more preferably in a range of not less than 0.2 part by weight and not more than 3 parts by weight, with respect to 100 parts by weight of the polyethylene resin particles.

In the foaming step, an auxiliary dispersion agent may be used in combination with the dispersing agent. The auxiliary dispersion agent is preferably a surfactant. Examples of the surfactant are anionic surfactants, nonionic surfactants, amphoteric surfactants, anionic polymer surfactants, and nonionic polymer surfactants. Examples of the anionic surfactants are sodium dodecylbenzenesulfonate, sodium n-paraffin sulfonate, sodium α-olefin sulfonate, and sodium alkyl diphenylether sulfonate.

Examples of the nonionic surfactants are polyoxyethylene alkyl ether, and polyoxyethylene sorbitan fatty acid ester.

Examples of the amphoteric surfactants are alkyl betaine and alkyl amine oxide. Examples of the anionic polymer surfactants are polyacrylic acid salt, polystyrene sulfonate salt, and maleic acid-α-olefin copolymer salt. An example of the nonionic polymer surfactants is polyvinyl alcohol. These surfactants can be used solely or in combination of two or more kinds.

A preferable auxiliary dispersion agent in the foaming step depends on a kind of the dispersing agent employed and accordingly cannot be unconditionally defined. However, for example, in a case where trimagnesium phosphate or tricalcium phosphate is used as the dispersing agent, it is preferable to use an anionic surfactant. This is because a stable dispersion state can be obtained by using the anionic surfactant.

An amount of the auxiliary dispersion agent in the foaming step depends on a kind of the auxiliary dispersion agent or a kind or an amount of polyethylene resin employed. Accordingly, the mount of the auxiliary dispersion agent cannot be unconditionally defined. However, in general, the amount of the auxiliary dispersion agent is preferably in a range of not less than 0.001 part by weight and not more than 0.2 part by weight with respect to 100 parts by weight of water.

Examples of the foaming agent used in the present invention are aliphatic hydrocarbon such as propane, isobutene, normal butane, isopentane, and normal pentane, and a mixture thereof, inorganic gas such as nitrogen and carbon dioxide gas, and the air, and water. Among these foaming agents, the inorganic gas and water are preferable because the inorganic gas and water are environment-friendly and has no risk of fire disaster or explosion.

An amount of the foaming agent used in the present invention depends on, for example, a kind of polyethylene resin employed, a kind of the foaming agent, or a target expansion ratio. Accordingly, the amount cannot be unconditionally defined. However, the amount of the foaming agent is preferably in a range of not less than 2 parts by weight and not more than 60 parts by weight and more preferably in a range of not less than 4 parts by weight and not more than 15 parts by weight with respect to 100 parts by weight of the polyethylene resin particles.

While a water dispersion containing the polyethylene resin particles adjusted as described above in the pressure-resistant container is stirred, a pressure applied to the water dispersion and a temperature of the water dispersion are increased to predetermined levels, respectively and kept for a predetermined period (generally for 5 minutes to 180 minutes and preferably for 10 minutes to 60 minutes). Then, the water dispersion to which the pressure is applied and which contains the polyethylene resin particles is discharged into a low-pressure atmosphere (generally at an atmospheric pressure). Thereby, noncrosslinked polyethylene resin expanded particles are produced.

The predetermined temperature for heating inside the pressure-resistant container (hereinafter, also referred to as "foaming temperature") depends on a melting point (hereinafter, Tm (° C.)), a kind or the like of polyethylene resin employed and cannot be unconditionally defined. However, it is preferable to heat the pressure-resistant container up to a temperature that is equal to or higher than a softening temperature of the polyethylene resin and that is more preferably in a temperature range of not less than Tm−30 (° C.) not more than Tm+10° C.

Note that the melting point of the polyethylene resin is a melting peak temperature on a DSC curve obtained by using a differential scanning calorimeter at a second increase in temperature in the following steps (i) to (iii): (i) first, a temperature of 4 mg to 6 mg of polyethylene resin particles is increased from 10° C. to 190° C. at a rate of 10° C./min so that the polyethylene resin particles are melted; (ii) then, the temperature is decreased from 190° C. to 10° C. at a rate of 10° C./min so that thus melted polyethylene resin is crystallized; and (iii) further, the temperature is increased from 10° C. to 190° C. at a rate of 10° C./min.

The predetermined pressure applied inside the pressure-resistant container (hereinafter, also referred to as "foaming pressure") depends on a kind of polyethylene resin employed, a target expansion ratio of expanded particles obtained, or the like and cannot be unconditionally defined. However, the predetermined pressure is preferably in a range of not less than 1.5 MPa (gauge pressure) and not more than 5 MPa (gauge pressure) and more preferably in a range of not less than 2 MPa (gauge pressure) and not more than 4.5 MPa (gauge pressure). In a case where the foaming pressure is lower than 1.5 MPa (gauge), the expansion ratio tends to become too low. Meanwhile, in a case where the foaming pressure is higher than 5 MPa (gauge pressure), a cell diameter of the expanded particles obtained tends to become too fine.

The atmosphere into which the water dispersion is discharged in the foaming step is generally at a room temperature. However, by using a heating medium such as water vapor or the like, the atmosphere may be heated to a temperature in a range of 60° C. to 120° C. and preferably in a range of 80° C. to 110° C. This makes it possible to obtain noncrosslinked polyethylene resin expanded particles having a shrinkage factor in a range of not less than 2% and not more than 30% and a higher expansion ratio as compared to a case where the water dispersion is discharged into the atmosphere at the room temperature.

The noncrosslinked polyethylene resin expanded particles (hereinafter, also referred to as "first stage expanded particles") obtained by the first stage expansion step as described above may be directly used for in-mold expansion molding. Alternatively, thus obtained noncrosslinked polyethylene resin expanded particles may be expanded again so that noncrosslinked polyethylene resin expanded particles obtained have a target expansion ratio, and then may be used in in-mold expansion molding. Note that hereinafter, the step for further expanding expanded particles that have been once obtained may also be referred to as "second stage expansion step". Thus obtained noncrosslinked polyethylene resin expanded particles may also be called "second stage expanded particles".

For the second stage expansion step, a conventionally known method can be used. For example, the second stage expansion step can be carried out as follows.

Specifically, the second stage expansion step can be carried out as follows: (i) first, noncrosslinked polyethylene resin expanded particles are put in a pressure tank; (ii) then, a predetermined pressure is applied with the air to the noncrosslinked polyethylene resin expanded particles (that is, the air is introduced into the noncrosslinked polyethylene resin expanded particles and the noncrosslinked polyethylene resin expanded particles are left for a predetermined period of time) and thereby, an internal pressure of the expanded particles is increased to be higher than the atmospheric pressure; (iii) then, the noncrosslinked polyethylene resin expanded particles are heated by water vapor whose pressure is preferably in a range of not less than 0.03 MPa (gauge pressure) and not more than 0.15 MPa (gauge pressure) and more preferably in a range of not less than 0.045 MPa (gauge pressure) and not more than 0.10 MPa (gauge pressure).

In a case where the pressure of the water vapor is less than 0.03 MPa (gauge pressure), the shrinkage factor of the expanded particles becomes small. Accordingly, foaming power is low in molding. As a result, thus obtained expansion molded article has a higher dimensional shrinkage factor with respect to a metal mold and a surface of this expansion molded article less stretches. In other aspect, respective expansion ratios of thus obtained expanded particles tend to become more uneven and consequently, respective weights of molded articles may vary more widely. Meanwhile, in a case where the pressure of the water vapor is over 0.15 MPa (gauge pressure), the expanded particles may fuse to each other and as a result may not be used for molding.

Here, the internal pressure of the noncrosslinked polyethylene resin expanded particles is adjusted in a range of 0.05 MPa to 0.70 MPa (gauge pressure) and preferably, in a range of 0.10 MPa to 0.50 MPa (gauge pressure). In a case where the internal pressure of the noncrosslinked polyethylene resin expanded particles is less than 0.05 MPa (gauge pressure), a high-pressure water vapor tends to be required for improving the expansion ratio. Meanwhile, in a case where the internal pressure is over 0.70 MPa (gauge pressure), cells in the noncrosslinked polyethylene resin expanded particles tend to be continuous in the second stage expansion step. Consequently, when such noncrosslinked polyethylene resin expanded particles are filled in a metal mold and subjected to in-mold expansion molding, a noncrosslinked polyethylene resin expansion molded article obtained may be a shrunk article.

The noncrosslinked polyethylene resin expanded particle of the present invention has an average cell diameter preferably in a range of not less than 200 μm and not more than 700 μm, and more preferably in a range of not less than 300 μm and not more than 600 μm. In a case where the average cell diameter is less than 200 μm, shrinkage of the noncrosslinked polyethylene resin expansion molded article obtained tends to be higher. Meanwhile, in a case where the average cell diameter is over 700 μm, an appearance of the noncrosslinked polyethylene resin expansion molded article obtained tends to deteriorate.

The average cell diameter here is measured as follows. That is, an image of a cross section of an expanded particle is obtained by using a microscope or the like. In such an image, a line passing substantially a center of the expanded particle is drawn. Then, the average cell diameter is obtained by using the formula (2) below:

$$\text{Average Cell Diameter}(\mu m) = L/n \quad (2)$$

wherein: n is the number of cells which the line passes through; and L (μm) is an expanded particle diameter determined by intersections of the line and a surface of 1the expanded particle. Here the number of cells and the expanded particle diameter are read from the image.

In the present invention, after the noncrosslinked polyethylene resin expanded particles are filled in a metal mold of a predetermined shape, the noncrosslinked polyethylene resin expanded particles are heated by water vapor or the like and fused to each other. By carrying out in-mold expansion molding, it is possible to obtain a noncrosslinked polyethylene resin expansion molded article.

Examples of a method of the in-mold expansion molding are the following (A) to (C):

(A) a method in which: first, a pressure is applied with inorganic gas such as the air, nitrogen or carbon dioxide, to polyethylene resin expanded particles; thereby, the polyethylene resin expanded particles are impregnated with the inorganic gas, so that a predetermined internal pressure is given to the polyethylene resin expanded particles; then, the polyethylene resin expanded particles are filled in a metal mold; and subsequently, the polyethylene resin expanded particles are heated and fused by water vapor;

(B) a method in which: first, the polyethylene resin expanded particles are compressed by gas pressure and filled in a metal mold; and then, by utilizing restoration force of the polyethylene resin expanded particles, the polyethylene resin expanded particles are heated and fused by water vapor; and (C) a method in which the polyethylene resin expanded particles that have not been specifically pretreated are filled in a metal mold, and then heated and fused by water vapor.

In regard to the noncrosslinked polyethylene resin expansion molded article obtained in the present invention, the dimensional shrinkage factor with respect to a metal mold is small and deformation is small. Further, a surface of the noncrosslinked polyethylene resin expansion molded article stretches well.

EXAMPLES

The following explains in detail a method for producing the noncrosslinked polyethylene resin expanded particle of the present invention, with reference to Examples and Comparative Examples. Note that the present invention is by no means limited to the following Examples.

Note that Examples and Comparative Examples were evaluated according to the following method.

<Measurement of Melt Flow Index>

A melt flow index (MI) was measured by using an MI measuring equipment described in JIS K7210, under the following conditions: orifice diameter of $\phi$ 2.0959±0.005 mm; orifice length of 8.000±0.025 mm; load of 2160 g; and resin temperature of 190±0.2° C.

<Measurement of Fraction of Insoluble Gel in Hot Xylene>

Into a wire mesh bag having 200 meshes, 0.5 g of resin particles or expanded particles were put. Then, an end of the wire mesh bag was folded so that the resin particles or expanded particles did not come out. Further, after this wire mesh bag was immersed for three hours in 50 ml of xylene boiled at an atmospheric pressure, the wire mesh bag was cooled and taken out of xylene. This operation was repeated three times in total. After the wire mesh bag taken out was dried overnight at a room temperature, the wire mesh bag was dried for an hour in an oven at 150° C. Then, the wire mesh bag was naturally cooled. An amount of components remaining in the wire mesh bag after the cooling was defined as a gel component amount.

A ratio by weight of thus obtained gel component amount with respect to an original weight of the resin particles or expanded particles was defined as a fraction of insoluble gel in hot xylene. Note that an average value at N=2 was obtained as a fraction of insoluble gel.

<Measurement of Expansion Ratio>

First, approximately not less than 3 g and not more than 10 g of the expanded particles obtained are taken and dried at 60° C. for 2 hours. Then, after the expanded particles are left still for an hour in a constant-temperature constant-humidity room at 23° C. and at a humidity of 50%, a weight w (g) was measured. Subsequently, the expanded particles were immersed in a measuring cylinder containing ethanol, and a volume v (cm$^3$) was measured by an ascent of water level (water immersion method). Further, a true specific gravity $\rho_b = w/v$ of the expanded particles was obtained. In addition, from a ratio to a density $\rho_r$ of unexpanded polyethylene resin particles, the expansion ratio $K = \rho_r/\rho_b$ was obtained.

Note that in all of the following Examples and Comparative Examples except Example 12 below, the density of the unexpanded polyethylene resin particles was 0.926 g/cm³ (0.931 g/cm³ in Example 12).

<Measurement of Bulk Density BD and VBD>

BD and VBD are measured as follows.

First, a weight of expanded particles to be measured is defined as $W_1$, and a volume $V_1$ is obtained at 23° C. and at an atmospheric pressure (normal atmospheric pressure of 0.1 MPa) by using a measuring cylinder. From the formula (3) below, BD is obtained. BD is a bulk density of noncrosslinked polyethylene resin expanded particles at 23° C. and at 0.1 MPa (at a normal atmospheric pressure).

$$BD(g/L) = W_1/V_1 \tag{3}$$

Now a weight of the expanded particles to be measured is defined as $W_2$. The expanded particles are put in a pressure-resistant container that has a scale. Then, a pressure inside the pressure-resistant container is reduced by a vacuum pump or the like. After it is checked by a manometer that the pressure is reduced to 0.002 MPa or less inside the pressure-resistant container, the pressure-resistant container is vibrated by a vibrator until a top of the expanded particles stays at a level on the scale. The level on the scale at which the top of the expanded particles stays in the pressure-resistant container is read and this level is defined as a volume $V_2$. Note that at a reduced pressure, a change in volume may be hampered because the expanded particles push each other. Therefore, the pressure is gradually reduced, while, for example, the pressure-resistant container is laid down so that the change in volume of the expanded particles is not hampered.

According to the formula (4), a bulk density VBD of the noncrosslinked polyethylene resin expanded particles is obtained under conditions at 23° C. and at a pressure equal to 0.002 MPa or less.

$$VBD(g/L) = W_2/V_2 \tag{4}$$

In Example 8 and Comparative Example 5, the following evaluation of a polyethylene resin expansion molded article was carried out, after the polyethylene resin expansion molded article was (i) dried for 48 hours in an atmosphere at a temperature in a range of 75° C. to 80° C. and (ii) then left still for 24 hours in a constant-temperature constant-humidity room at 23° C. and at a humidity of 50%. In Examples and Comparative Examples except Example 8 and Comparative Example 5, the evaluation was carried out, after the polyethylene resin expansion molded article was (i) dried for 24 hours in an atmosphere at a temperature in a range of 75° C. to 80° C. and (ii) then left still for 24 hours in a constant-temperature constant-humidity room at 23° C. and at a humidity of 50%.

<Density Measurement of Expanded Article>

An expanded article obtained by in-mold expansion molding was dried for a predetermined period in an atmosphere at a temperature in a range of 75° C. to 80° C. Then, after the expansion molded article was left still for 24 hours in a constant-temperature constant-humidity room at 23° C. and at a humidity of 50%, a weight $W_3$ of the expanded article was measured. Further, measurement was carried out regarding a change in volume $V_3$ in a case where the expansion molded article was immersed in water. According to the formula (5), a density (g/L) of the expansion molded article was obtained.

$$\text{Density of Expansion molded Article}(g/L) = W_3/V_3 \tag{5}$$

<Fusibility>

In the vicinity of a center of the expansion molded article obtained, a crack having a depth of approximately 5 mm was made by a knife or the like. Then, the expansion molded article was split along the crack. Thus obtained fracture cross section was observed.

As a result of the observation, a ratio of the number of broken particles with respect to the number of total particles on the fracture cross section was obtained and defined as a fusion rate of the molded article. Then, fusibility was evaluated according to the following criteria.

Excellent: The fusion rate was in a range of not less than 80%.
Good: The fusion rate was in a range of not less than 60% and less than 80%.
Poor: The fusion rate was in a range of less than 60%.

<Dimensional Shrinkage Factor with Respect to Metal Mold>

A longitudinal dimension (400 mm direction) of the expansion molded article obtained was measured by using a digital caliper (Mitutoyo Co.).

A dimension of a corresponding metal mold was defined as $L_0$ and a dimension of the expanded article was defined as $L_1$. Then, a dimensional shrinkage factor with respect to the metal mold was calculated by the formula (6), and then evaluated according to the following criteria.

$$\text{Dimensional Shrinkage Factor With Respect To Metal Mold} = (L_0 - L_1)/L_0 \times 100 \tag{6}$$

Excellent: The dimensional shrinkage factor with respect to the metal mold was in a range of 3% or less.
Good: The dimensional shrinkage factor with respect to the metal mold was in a range of higher than 3% and 4% or less.
Poor: The dimensional shrinkage factor with respect to the metal mold was in a range of higher than 4%.

<Surface Stretchability>

An end section of the expansion molded article obtained was observed and evaluated according to the following criteria.

Excellent: Adjacent expanded particles were well fused to each other at any part and no space was produced between the adjacent expanded particles.
Good: There are a few positions where a space was observed between the adjacent expanded particles.
Poor: There are many positions at each of which a space was observed between the adjacent expanded particles. The end section of the expansion molded particle obtained is a ridgeline section along which surfaces of the in-mold expansion molded article intersect.

<Deformation>

At a position where a sink mark tends to occur on the expansion molded article, a thickness was measured by using Neck Caliper (manufactured by Mitutoyo Corporation). The position where the thickness was measured was 50 mm apart from an edge section in a longitudinal direction and 50 mm apart from an edge section in a lateral direction of the expansion molded article. Then, deformation was evaluated according to the following criteria.

Excellent: The thickness was not less than 48.5 mm.
Good: The thickness was not less than 47 mm and less than 48.5 mm.
Poor: The thickness was less than 47 mm.

Example 1

[Preparation of Resin Particles]

With respect to 100 parts by weight of linear low-density polyethylene as base resin, 0.2 part by weight of glycerin (manufactured by Lion Corporation, Purified Glycerin D) as the hydrophilic compound was dry blended. The linear low-density polyethylene had MI=2 g/10 min, a melting point: 123° C., a fraction of insoluble gel in hot xylene: 0.3% by weight, and a resin density: 0.926 g/cm$^3$. This linear low-density polyethylene contained, as a comonomer, 8.2% by weight of 4-methyl-1-pentene.

Thus dry blended mixture was fused and kneaded at a resin temperature of 210° C. by using a uniaxial extruder. Then, the mixture was extruded in the form of strand through a circular die attached to an end of the extruder. Then, after the mixture extruded was cooled down, the mixture was cut by a cutter so that polyethylene resin particles having a particle weight of 1.3 mg/particle was obtained.

[Preparation of Expanded Particles]

In a pressure-resistant autoclave whose capacity was 0.3 m$^3$, the following materials were set: 100 parts by weight (80 kg) of the polyethylene resin particles obtained above, 200 parts by weight of water, 0.5 part by weight of tricalcium phosphate (manufactured by Taihei Chemical Industrial Co., Ltd.) as the poorly water-soluble inorganic compound, and 0.03 part by weight of sodium alkyl sulfonate as the surfactant. While these materials were stirred, 7 parts by weight of carbon dioxide gas as the foaming agent was added.

A temperature of the materials inside the autoclave were heated up to a foaming temperature of 123° C. Then, carbon dioxide gas was additionally injected so that a pressure inside the autoclave increases to a foaming pressure of 3.0 MPa (gauge pressure). Then, the foaming temperature and the foaming pressure were retained for 30 minutes. Subsequently, a valve at a bottom of the autoclave was opened, so that the materials inside the autoclave were discharged into an atmosphere at 100° C., through a single-hole orifice having φ 3.6 mm. Thereby, the noncrosslinked polyethylene resin expanded particles (first stage expanded particles) were obtained.

Table 1 shows a result of evaluation of the noncrosslinked polyethylene resin expanded particles.

[Preparation of In-Mold Expansion Molded Article]

Thus obtained noncrosslinked polyethylene resin expanded particles were dried and then filled in a metal mold having the following dimension: 400 mm (in longitudinal direction)×300 mm (in lateral direction)×50 mm (in thickness direction). Further, in-mold expansion molding was carried out at a vapor pressure of 0.11 MPa (gauge pressure). Thereby, a noncrosslinked polyethylene resin expansion molded article was obtained.

Table 1 shows a result of evaluation of thus obtained noncrosslinked polyethylene resin expansion molded article.

Example 2 to 4

After the noncrosslinked polyethylene resin expanded particles (first stage expanded particles) obtained in [Preparation of Expanded Particles] in Example 1 were dried, the noncrosslinked polyethylene resin expanded particles were impregnated with the air by pressure application with the air and the second stage expansion step was carried out by using an internal pressure and a water vapor pressure that are shown in Table 1. Except the process described above, polyethylene resin particles, noncrosslinked polyethylene resin expanded particles and a noncrosslinked polyethylene resin expansion molded article were obtained as in Example 1.

Table 1 shows a result of evaluation of the noncrosslinked polyethylene resin expanded particles and the noncrosslinked polyethylene resin expansion molded article.

Example 5

In [Preparation of Resin Particles], 0.5 part by weight of polyethylene glycol (manufactured by Lion Corporation, PEG 300 (hereinafter, referred to as PEG)) was used as the hydrophilic compound with respect to 100 parts by weight of the linear low-density polyethylene. Except this, polyethylene resin particles, noncrosslinked polyethylene resin expanded particles (first stage expanded particles) and a noncrosslinked polyethylene resin expansion molded article were obtained as in Example 1.

Table 1 shows a result of evaluation of the noncrosslinked polyethylene resin expanded particles and the noncrosslinked polyethylene resin expansion molded article.

Examples 6 and 7

In [Preparation of Resin Particles], after the noncrosslinked polyethylene resin expanded particles (first stage expanded particles) obtained in Example 5 were dried, the noncrosslinked polyethylene resin expanded particles were impregnated with the air by pressure application with the air and the second stage expansion step was carried out by using an internal pressure and a vapor pressure that are shown in Table 1. Except the process described above, polyethylene resin particles, noncrosslinked polyethylene resin expanded particles and a noncrosslinked polyethylene resin expansion molded article were obtained as in Example 1. Table 1 shows a result of evaluation of the noncrosslinked polyethylene resin expanded particles and the noncrosslinked polyethylene resin expansion molded article.

Example 8

[Preparation of Resin Particles]

Here, the particle weight is changed to 4.5 mg/particle. Except this, polyethylene resin particles were obtained as in Example 1.

[Preparation of Expanded Resin Particles]

A diameter of an orifice used was changed to φ 4.0 mm. Except this, noncrosslinked polyethylene resin expanded particles (first stage expanded particles) were obtained as in Example 1.

Further, after thus obtained noncrosslinked polyethylene resin expanded particles (first stage expanded particles) were dried, the noncrosslinked polyethylene resin expanded particles were impregnated with the air by pressure application with the air and the second stage expansion step was carried out by using an internal pressure and a vapor pressure that are shown in Table 1. Thereby, noncrosslinked polyethylene resin expanded particles (second stage expanded particles) were obtained.

Table 1 shows a result of evaluation of the noncrosslinked polyethylene resin expanded particles.

[Preparation of In-Mold Expansion Molded Article]

From thus obtained noncrosslinked polyethylene resin expanded particles (second stage expanded particles), a noncrosslinked polyethylene resin expansion molded article was obtained as in Example 1.

Table 1 shows a result of evaluation of thus obtained noncrosslinked polyethylene resin expansion molded article.

Example 9

In [Preparation of Resin Particles], 0.5 part by weight of polypropylene glycol (manufactured by Wako Pure Chemical Industries, Ltd., average molecular weight: 300 (hereinafter, referred to as PPG)) was used as the hydrophilic compound with respect to 100 parts by weight of the linear low-density polyethylene. Except this, polyethylene resin particles, noncrosslinked polyethylene resin expanded particles (first stage expanded particles) and a noncrosslinked polyethylene resin expansion molded article were obtained as in Example 1.

Table 1 shows a result of evaluation of the noncrosslinked polyethylene resin expanded particles and the noncrosslinked polyethylene resin expansion molded article.

Example 10

[Preparation of Resin Particles]

In the present Example, the hydrophilic compound was not used. Except this, polyethylene resin particles were obtained as in Example 1.

[Preparation of Expanded Resin Particles]

From thus obtained polyethylene resin particles, noncrosslinked polyethylene resin expanded particles (first stage expanded particles) were obtained as in Example 1.

Further, after thus obtained noncrosslinked polyethylene resin expanded particles (first stage expanded particles) were dried, the noncrosslinked polyethylene resin expanded particles were impregnated with the air by pressure application with the air and the second stage expansion step was carried out by using an internal pressure and a vapor pressure that are shown in Table 1. Thereby, noncrosslinked polyethylene resin expanded particles (second stage expanded particles) were obtained.

Table 1 shows a result of evaluation of the noncrosslinked polyethylene resin expanded particles.

[Preparation of In-Mold Expansion Molded Article]

From thus obtained noncrosslinked polyethylene resin expanded particles (second stage expanded particles), a noncrosslinked polyethylene resin expansion molded article was obtained as in Example 1.

Table 1 shows a result of evaluation of thus obtained noncrosslinked polyethylene resin expansion molded article.

Example 11

[Preparation of Resin Particles]

In the present Example, 1 part by weight of ionomer resin (manufactured by Sumitomo Seika Chemicals Co., Ltd., AQUA CALK) was used as the hydrophilic compound. Except this, polyethylene resin particles were obtained as in Example 1.

[Preparation of Expanded Resin Particles]

From thus obtained polyethylene resin particles, noncrosslinked polyethylene resin expanded particles (first stage expanded particles) were obtained as in Example 1.

Further, after thus obtained noncrosslinked polyethylene resin expanded particles (first stage expanded particles) were dried, the noncrosslinked polyethylene resin expanded particles were impregnated with the air by pressure application with the air and the second stage expansion step was carried out by using an internal pressure and a vapor pressure that are shown in Table 1. Thereby, noncrosslinked polyethylene resin expanded particles (second stage expanded particles) were obtained.

Table 1 shows a result of evaluation of the noncrosslinked polyethylene resin expanded particles.

[Preparation of In-Mold Expansion Molded Article]

From thus obtained noncrosslinked polyethylene resin expanded particles (second stage expanded particles), a noncrosslinked polyethylene resin expansion molded article was obtained as in Example 1.

Table 1 shows a result of evaluation of thus obtained noncrosslinked polyethylene resin expansion molded article.

Example 12

[Preparation of Resin Particles]

In the present Example, a linear low-density polyethylene having MI=2 g/10 min, a melting point: 123° C., a fraction of insoluble gel in hot xylene: 0.3% by weight, and a resin density: 0.931 g/cm$^3$ was used as base resin. This linear low-density polyethylene contained, as a comonomer, 5.3% by weight of 1-hexene. Except this, polyethylene resin particles were obtained as in Example 1.

[Preparation of Expanded Resin Particles]

From thus obtained polyethylene resin particles, noncrosslinked polyethylene resin expanded particles were obtained as in Example 1. Further, after thus obtained noncrosslinked polyethylene resin expanded particles (first stage expanded particles) were dried, the noncrosslinked polyethylene resin expanded particles were impregnated with the air by pressure application with the air and the second stage expansion step was carried out by using an internal pressure and a vapor pressure that are shown in Table 1. Thereby, noncrosslinked polyethylene resin expanded particles (second stage expanded particles) were obtained.

Table 1 shows a result of evaluation of the noncrosslinked polyethylene resin expanded particles.

[Preparation of In-Mold Expansion Molded Article]

From thus obtained noncrosslinked polyethylene resin expanded particles (second stage expanded particles), a noncrosslinked polyethylene resin expansion molded article was obtained by a method as in Example 1.

Table 1 shows a result of evaluation of thus obtained noncrosslinked polyethylene resin expansion molded article.

TABLE 1

| | | | Example 1 | Example 2 | Example 3 | Example 4 | Example 5 | Example 6 |
|---|---|---|---|---|---|---|---|---|
| Resin Particles | Hydrophilic Compound | | Glycerin | Glycerin | Glycerin | Glycerin | PEG | PEG |
| | Added Amount | Part by Weight | 0.2 | 0.2 | 0.2 | 0.2 | 0.5 | 0.5 |
| First Stage Expanded Particles | Expansion Ratio | -time | 8.5 | 8.5 | 8.5 | 8.5 | 7.6 | 7.6 |
| | BD | g/L | 65 | 65 | 65 | 65 | 72 | 72 |
| | VBD | g/L | 61 | 61 | 61 | 61 | 69 | 69 |
| | Shrinkage Factor | % | 6.6 | 6.6 | 6.6 | 6.6 | 4.3 | 4.3 |
| | Cell Diameter | μm | 270 | 270 | 270 | 270 | 260 | 260 |
| | Gel Fraction | wt % | 0.8 | 0.8 | 0.8 | 0.8 | 0.9 | 0.9 |

TABLE 1-continued

| | | | | | | | |
|---|---|---|---|---|---|---|---|
| Conditions For Second Stage Expansion Step | Internal Pressure | MPa·G | | 0.28 | 0.17 | 0.12 | 0.32 |
| | Vapor Pressure | MPa·G | | 0.06 | 0.09 | 0.06 | 0.06 |
| Second Stage Expanded Particles | Expansion Ratio | -time | | 26.7 | 25.5 | 15.4 | 26.2 |
| | BD | g/L | | 20.4 | 21.5 | 35.3 | 20.9 |
| | VBD | g/L | | 19.2 | 16.9 | 32.7 | 19.4 |
| | Shrinkage Factor | % | | 6.3 | 27.2 | 8.0 | 7.7 |
| | Cell Diameter | μm | | 410 | 410 | 340 | 400 |
| | Gel Fraction | wt % | | 0.7 | 0.7 | 0.9 | 0.6 |
| Expansion Molded Article | Density | g/L | 72.8 | 23.5 | 24.2 | 39.2 | 79.2 | 23.8 |
| | Fusibility | | Excellent | Excellent | Excellent | Excellent | Excellent | Excellent |
| | Shrinkage Factor With Respect To Metal Mold | | Excellent | Excellent | Excellent | Excellent | Excellent | Excellent |
| | Surface Stretchability | | Good | Excellent | Excellent | Excellent | Good | Excellent |
| | Deformation | | Excellent | Excellent | Excellent | Excellent | Excellent | Excellent |

| | | | Example 7 | Example 8 | Example 9 | Example 10 | Example 11 | Example 12 |
|---|---|---|---|---|---|---|---|---|
| Resin Particles | Hydrophilic Compound | | PEG | Glycerin | PPG | — | Ionomer Resin | Glycerin |
| | Added Amount | Part by Weight | 0.5 | 0.2 | 0.5 | — | 1 | 0.2 |
| First Stage Expanded Particles | Expansion Ratio | -time | 7.6 | 10.6 | 7.9 | 5.7 | 7.9 | 8.4 |
| | BD | g/L | 72 | 50 | 70 | 95 | 69 | 66 |
| | VBD | g/L | 69 | 46 | 67 | 94 | 62 | 62 |
| | Shrinkage Factor | % | 4.3 | 8.7 | 4.5 | 1.1 | 11.3 | 6.5 |
| | Cell Diameter | μm | 260 | 260 | 260 | 210 | 210 | 250 |
| | Gel Fraction | wt % | 0.9 | 0.6 | 0.7 | 0.8 | 0.8 | 0.7 |
| Conditions For Second Stage Expansion Step | Internal Pressure | MPa·G | 0.19 | 0.45 | 0.31 | 0.49 | 0.34 | 0.31 |
| | Vapor Pressure | MPa·G | 0.06 | 0.06 | 0.06 | 0.07 | 0.05 | 0.06 |
| Second Stage Expanded Particles | Expansion Ratio | -time | 15.4 | 41.6 | 25.9 | 25.1 | 26.1 | 27.1 |
| | BD | g/L | 35.1 | 12.8 | 21.1 | 21.9 | 20.9 | 19.9 |
| | VBD | g/L | 32.8 | 10.2 | 19.3 | 18.1 | 18.9 | 18.8 |
| | Shrinkage Factor | % | 7.0 | 25.5 | 9.3 | 21.0 | 10.6 | 5.9 |
| | Cell Diameter | μm | 330 | 410 | 400 | 370 | 350 | 400 |
| | Gel Fraction | wt % | 0.8 | 0.3 | 0.7 | 0.6 | 0.5 | 0.6 |
| Expansion Molded Article | Density | g/L | 38.7 | 14.5 | 24.1 | 24.9 | 24.1 | 22.5 |
| | Fusibility | | Excellent | Excellent | Excellent | Excellent | Excellent | Excellent |
| | Shrinkage Factor With Respect To Metal Mold | | Excellent | Excellent | Excellent | Good | Good | Excellent |
| | Surface Stretchability | | Excellent | Excellent | Excellent | Excellent | Excellent | Excellent |
| | Deformation | | Excellent | Excellent | Excellent | Good | Good | Excellent |

Comparative Examples 1 to 3

In [Preparation of Resin Particles], after the noncrosslinked polyethylene resin expanded particles (first stage expanded particles) obtained in Example 1 were dried, the noncrosslinked polyethylene resin expanded particles were impregnated with the air by pressure application with the air and the second stage expansion step was carried out by using an internal pressure and a water vapor pressure that are shown in Table 2. Except the process described above, polyethylene resin particles, noncrosslinked polyethylene resin expanded particles and a noncrosslinked polyethylene resin expansion molded article were obtained as in Example 1.

Table 2 shows a result of evaluation of the noncrosslinked polyethylene resin expanded particles and the noncrosslinked polyethylene resin expansion molded article.

Comparative Example 4

In [Preparation of Resin Particles], after the noncrosslinked polyethylene resin expanded particles (first stage expanded particles) obtained in Example 5 were dried, the noncrosslinked polyethylene resin expanded particles were impregnated with the air by pressure application with the air and the second stage expansion step was carried out by using an internal pressure and a water vapor pressure that are shown in Table 2. Except the process described above, polyethylene resin particles, noncrosslinked polyethylene resin expanded particles and a noncrosslinked polyethylene resin expansion molded article were obtained as in Example 1.

Table 2 shows a result of evaluation of the noncrosslinked polyethylene resin expanded particles and the noncrosslinked polyethylene resin expansion molded article.

Comparative Example 5

In [Preparation of Resin Particles], after the noncrosslinked polyethylene resin expanded particles (first stage expanded particles) obtained in Example 8 were dried, the noncrosslinked polyethylene resin expanded particles were impregnated with the air by pressure application with the air and the second stage expansion step was carried out by using an internal pressure and a water vapor pressure that are shown in Table 2. Except the process described above, polyethylene resin particles, noncrosslinked polyethylene resin expanded particles and a noncrosslinked polyethylene resin expansion molded article were obtained as in Example 1.

Table 2 shows a result of evaluation of the noncrosslinked polyethylene resin expanded particles and the noncrosslinked polyethylene resin expansion molded article.

Comparative Example 6

[Preparation of Resin Particles]

In the present Example, the hydrophilic compound was not used. Except this, polyethylene resin particles were obtained as in Example 1.

[Preparation of Expanded Resin Particles]

From thus obtained polyethylene resin particles, noncrosslinked polyethylene resin expanded particles (first stage expanded particles) were obtained as in Example 1.

Table 2 shows a result of evaluation of the noncrosslinked polyethylene resin expanded particles.

[Preparation of In-Mold Expansion Molded Article]

From thus obtained noncrosslinked polyethylene resin expanded particles (first stage expanded particles), a noncrosslinked polyethylene resin expansion molded article was obtained as in Example 1.

Table 2 shows a result of evaluation of thus obtained noncrosslinked polyethylene resin expansion molded article.

Comparative Example 7

In [Preparation of Resin Particles], 0.3 part by weight of glycerin (manufactured by Lion Corporation, Purified Glycerin D) was used as the hydrophilic compound with respect to 100 partsby weight of the linear low-density polyethylene. Except this, polyethylene resin particles, noncrosslinked polyethylene resin expanded particles (first stage expanded particles) and a noncrosslinked polyethylene resin expansion molded article were obtained as in Example 1.

Table 2 shows a result of evaluation of the noncrosslinked polyethylene resin expanded particles and the noncrosslinked polyethylene resin expansion molded article.

Reference Example 1

In [Preparation of In-Mold Expansion molded Article], with respect to the noncrosslinked polyethylene resin expanded particles (second stage expanded particles) obtained in Comparative Example 3, a pressure at 0.10 MPa (gauge pressure) was applied with the air for 12 hours. Thereby, the noncrosslinked polyethylene resin expanded particles were provided with an internal pressure of 0.04 MPa (gauge pressure). Except the process described above, a noncrosslinked polyethylene resin expansion molded article was obtained as in Example 1.

Table 2 shows a result of evaluation of thus obtained noncrosslinked polyethylene resin expansion molded article.

Reference Example 2

In [Preparation of In-Mold Expansion molded Article], with respect to the noncrosslinked polyethylene resin expanded particles (second stage expanded particles) obtained in Comparative Example 4, a pressure at 0.10 MPa (gauge pressure) was applied with the air for 12 hours. Thereby, the noncrosslinked polyethylene resin expanded particles were provided with an internal pressure of 0.04 MPa (gauge pressure). Except the process described above, a noncrosslinked polyethylene resin expansion molded article was obtained as in Example 1.

Table 2 shows a result of evaluation of thus obtained noncrosslinked polyethylene resin expansion molded article.

TABLE 2

| | | | Comparative Example 1 | Comparative Example 2 | Comparative Example 3 | Comparative Example 4 | Comparative Example 5 | Comparative Example 6 | Comparative Example 7 | Reference Example 1 | Reference Example 2 |
|---|---|---|---|---|---|---|---|---|---|---|---|
| Resin Particles | Hydrophilic Compound | | Glycerin | Glycerin | Glycerin | PEG | Glycerin | — | Glycerin | Glycerin | PEG |
| | Added Amount | Part by Weight | 0.2 | 0.2 | 0.2 | 0.5 | 0.2 | — | 0.03 | 0.2 | 0.5 |
| First Stage Expanded Particles | Expansion Ratio | -time | 8.5 | 8.5 | 8.5 | 7.6 | 10.6 | 5.7 | 6.9 | 8.5 | 7.6 |
| | BD | g/L | 65 | 65 | 65 | 72 | 50 | 95 | 77.9 | 65 | 72 |
| | VBD | g/L | 61 | 61 | 61 | 69 | 46 | 94 | 76.5 | 61 | 69 |
| | Shrinkage Factor | % | 6.6 | 6.6 | 6.6 | 4.3 | 8.7 | 1.1 | 1.8 | 6.6 | 4.3 |
| | Cell Diameter | μm | 270 | 270 | 270 | 260 | 260 | 210 | 220 | 270 | 260 |
| | Gel Fraction | wt % | 0.8 | 0.8 | 0.8 | 0.9 | 0.6 | 0.8 | 0.7 | 0.8 | 0.9 |
| Conditions For Second Stage Expansion Step | Internal Pressure | MPa · G | 0.35 | 0.15 | 0.18 | 0.41 | 0.35 | | | 0.18 | 0.41 |
| | Vapor Pressure | MPa · G | 0.04 | 0.11 | 0.04 | 0.03 | 0.08 | | | 0.04 | 0.03 |
| Second | Expansion | -time | 25.2 | 25.4 | 15.4 | 26.6 | 38.9 | | | 15.4 | 26.6 |

TABLE 2-continued

| | | | Comparative Example 1 | Comparative Example 2 | Comparative Example 3 | Comparative Example 4 | Comparative Example 5 | Comparative Example 6 | Comparative Example 7 | Reference Example 1 | Reference Example 2 |
|---|---|---|---|---|---|---|---|---|---|---|---|
| Stage Expanded Particles | Ratio BD | g/L | 21.1 | 21.3 | 35.4 | 20.3 | 13.8 | | | 35.4 | 20.3 |
| | VBD | g/L | 20.7 | 15.7 | 34.9 | 20.0 | 9.8 | | | 34.9 | 20.0 |
| | Shrinkage Factor | % | 1.9 | 35.7 | 1.4 | 1.5 | 40.8 | | | 1.4 | 1.5 |
| | Cell Diameter | μm | 400 | 420 | 340 | 400 | 410 | | | 340 | 400 |
| | Gel Fraction | wt % | 0.7 | 0.7 | 0.8 | 0.6 | 0.3 | | | 0.8 | 0.8 |
| Expansion Molded Article | Bulk Density | g/L | 24.0 | 24.2 | 39.4 | 23.3 | 15.7 | 106 | 86.7 | 38.3 | 22.8 |
| | Fusibility | | Good | Poor | Good | Good | Poor | Good | Good | Excellent | Excellent |
| | Shrinkage Factor With Respect To Metal Mold | | Good | Excellent | Good | Good | Excellent | Good | Good | Excellent | Excellent |
| | Surface Stretchability | | Poor | Excellent | Poor | Poor | Excellent | Poor | Poor | Excellent | Excellent |
| | Deformation | | Good | Excellent | Excellent | Good | Excellent | Excellent | Excellent | Excellent | Excellent |

The invention claimed is:

1. A noncrosslinked polyethylene resin expanded particle (first stage expanded particle) having a bulk density BD in a range of not less than 10 g/L and not more than 100 g/L, the noncrosslinked polyethylene resin expanded particle (first stage expanded particle) being obtained by: (a) first introducing, into a pressure-resistant container, a polyethylene resin particle together with water, a foaming agent, and a dispersing agent, the polyethylene resin particle containing not less than 0.05 part by weight and not more than 2 parts by weight of at least one kind selected from the group consisting of glycerin, polyethylene glycol, and polypropylene glycol with respect to 100 parts by weight of polyethylene resin whose density is in a range of not less than 0.920 g/cm$^3$ and less than 0.940g/cm$^3$, and (b) expanding the polyethylene resin particle by discharging the polyethylene resin particle from the pressure-resistant container into a low-pressure atmosphere after a temperature and a pressure inside the pressure-resistant container are retained at predetermined levels, respectively, the low-pressure atmosphere being set at a temperature in a range of not less than 60° C. and not more than 120° C., the noncrosslinked polyethylene resin expanded particle (first stage expanded particle) having a shrinkage factor in a range of not less than 3% and not more than 30%, the shrinkage factor being obtained by the following formula (1):

$$\text{Shrinkage Factor} = (BD - VBD) \times 100 / VBD \quad (1),$$

wherein: the BD is a bulk density of the noncrosslinked polyethylene resin expanded particle (first stage expanded particle) at 23° C. and at 0.1 MPa (at a normal atmospheric pressure); and the VBD is a bulk density of the noncrosslinked polyethylene resin expanded particle (first stage expanded particle) at 23° C. and at a reduced pressure of 0.002 MPa or less.

2. The noncrosslinked polyethylene resin expanded particle (first stage expanded particle) as set forth in claim 1, being obtained by using inorganic gas as a foaming agent, the noncrosslinked polyethylene resin expanded particle having an average cell diameter in a range of not less than 200 μm and not more than 700 μm.

3. A noncrosslinked polyethylene resin expansion molded article obtained by in-mold expansion molding of the noncrosslinked polyethylene resin expanded particle (first stage expanded particle) as set forth in claim 1 having been filled in a metal mold.

4. A re-expanded noncrosslinked polyethylene resin expanded particle having a bulk density BD in a range of not less than 10 g/L and not more than 100 g/L, the re-expanded noncrosslinked polyethylene resin expanded particle being obtained by:
 (i) first obtaining a noncrosslinked polyethylene resin expanded particle (first stage expanded particle) by (a) introducing, into pressure-resistant container, a polyethylene resin particle together with water, a foaming agent, and a dispersing agent, the polyethylene resin particle containing polyethylene resin whose density is in a range of not less than 0.920 g/cm$^3$ and less than 0.940 g/cm$^3$, and (b) expanding the polyethylene resin particle by discharging the polyethylene resin particle from the pressure-resistant container into a low-pressure atmosphere after a temperature and a pressure inside the pressure-resistant container are retained at predetermined levels, respectively; and
 (ii) secondly obtaining the re-expanded noncrosslinked polyethylene resin expanded particle by re-expanding the noncrosslinked polyethylene resin expanded particle by re-expanding the noncrosslinked polyethylene resin expanded particle (first stage expanded particle), by:
 (a) putting the noncrosslinked polyethylene resin expanded particle (first stage expanded particle) in a pressure tank;
 (b) applying a predetermined pressure with the air to the noncrosslinked polyethylene resin expanded particle (first stage expanded particle) and thereby, increasing an internal pressure of the noncrosslinked polyethylene resin expanded particle (first stage expanded particle) to a pressure higher than the atmospheric pressure; and
 (c) then heating the noncrosslinked polyethylene resin expanded particle (first stage expanded particle) with water vapor whose pressure is in a range of not less than 0.045 MPa (gauge pressure) and not more than 0.10 MPa (gauge pressure),
 the re-expanded noncrosslinked polyethylene resin expanded particle having a shrinkage factor in a range of not less than 3% and not more than 30%, the shrinkage factor being obtained by the following formula (1):

$$\text{Shrinkage Factor} = (BD - VBD) \times 100 / VBD \quad (1),$$

wherein: the BD is a bulk density of the re-expanded noncrosslinked polyethylene expanded resin particle at 23° C. and at 0.1 MPa (at a normal atmospheric pressure); and the VBD is a bulk density of the re-expanded noncrosslinked polyethylene expanded resin particle at 23° C. and at a reduced pressure of 0.002 MPa or less.

5. The re-expanded noncrosslinked polyethylene resin expanded particle as set forth in claim 4, being obtained by using inorganic gas as a foaming agent, the noncrosslinked polyethylene resin expanded particle having an average cell diameter in a range of not less than 200 μm and not more than 700 μm.

6. A noncrosslinked polyethylene resin expansion molded article obtained by in-mold expansion molding of the re-expanded noncrosslinked polyethylene resin expanded particle as set forth in claim 4 having been filled in a metal mold.

7. The re-expanded noncrosslinked polyethylene resin expanded particle as set forth in claim 4, comprising not less than 0.01 part by weight and not more than 10 parts by weight of a hydrophilic compound with respect to 100 parts by weight of the polyethylene resin.

8. The re-expanded noncrosslinked polyethylene resin expanded particle as set forth in claim 7, wherein the hydrophilic compound is at least one kind selected from among a group consisting of glycerin, polyethyleneglycol, and polypropyleneglycol.

9. The re-expanded noncrosslinked polyethylene resin expanded particle as set forth in claim 8, wherein: an amount of the at least one kind selected from the group consisting of glycerin, polyethyleneglycol, and polypropyleneglycol is in a range of not less than 0.05 part by weight and not more than 2 parts by weight with respect to 100 parts by weight of polyethylene resin.

10. The noncrosslinked polyethylene resin expanded particle (first stage expanded particle) as set forth in claim 1, wherein the noncrosslinked polyethylene resin expanded particle (first stage expanded particle) has a shrinkage factor in a range of not less than 4.3% and not more than 30%.

11. The re-expanded noncrosslinked polyethylene resin expanded particle as set forth in claim 4, wherein the re-expanded noncrosslinked polyethylene resin expanded particle has a shrinkage factor in a range of not less than 4.3% and not more than 30%.

* * * * *